US011052762B2

(12) United States Patent
Nakamura et al.

(10) Patent No.: US 11,052,762 B2
(45) Date of Patent: Jul. 6, 2021

(54) COCKPIT FOR A VEHICLE

(71) Applicant: Toyota Jidosha Kabushiki Kaisha, Toyota (JP)

(72) Inventors: Nobuo Nakamura, Nagoya (JP); Toshikazu Tanemura, Aichi-ken (JP); Masaki Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 16/435,951

(22) Filed: Jun. 10, 2019

(65) Prior Publication Data

US 2019/0375295 A1    Dec. 12, 2019

(30) Foreign Application Priority Data

Jun. 12, 2018  (JP) .............................. JP2018-111954

(51) Int. Cl.
  *B60K 37/02*    (2006.01)
  *B60R 11/02*    (2006.01)
(52) U.S. Cl.
  CPC .............. *B60K 37/02* (2013.01); *B60R 11/02* (2013.01)

(58) Field of Classification Search
  None
  See application file for complete search history.

(56) References Cited

U.S. PATENT DOCUMENTS

| 7,394,405 B2 * | 7/2008 | Godden .................. G08G 3/02 340/988 |
| 10,384,690 B2 * | 8/2019 | Ravichandran ....... B60W 50/10 |
| 2014/0270243 A1 * | 9/2014 | Bennett .................... A61B 5/18 381/86 |
| 2019/0118850 A1 * | 4/2019 | Odate .................... B62D 1/046 |

FOREIGN PATENT DOCUMENTS

| JP | 2005-086604 A | 3/2005 |
| JP | 2011-046314 A | 3/2011 |

* cited by examiner

*Primary Examiner* — Faye M Fleming
(74) *Attorney, Agent, or Firm* — Dinsmore & Shohl LLP (57) ABSTRACT

A cockpit for a vehicle includes an interactive device and an instrument panel. The interactive device includes an entry section that collects a first voice messages produced by vehicle occupants and an output section that outputs a second voice messages to the vehicle occupants. The instrument panel is provided at a vehicle cabin front portion. The interactive device is fixed to the vehicle width direction center of the instrument panel. The entry section and output section are exposed to the vehicle cabin interior.

15 Claims, 3 Drawing Sheets

COCKPIT FOR A VEHICLE

CROSS-REFERENCE TO RELATED APPLICATIONS

This application claims priority to Japanese Patent Application No. 2018-111954 filed Jun. 12, 2018, the entire contents of which is incorporated by reference herein.

BACKGROUND

Technical Field

The present disclosure relates to a cockpit for a vehicle.

Related Art

Japanese Patent Application Laid-Open (JP-A) No. 2005-86604 discloses a speaker mounting structure. In the technology relating to JP-A No. 2005-86604, speakers are fitted into circular holes provided centrally in scale plates of a speedometer and tachometer in an instrument panel. Thus, the speakers may be disposed in attitudes opposing a driver.

In recent years, interactive devices that enable voice operations by voice interaction, such as smart speakers, have been developed. Using these interactive devices to conduct various operations in vehicles has been considered. It is expected that vehicle occupants other than drivers will also use these interactive devices. In these situations, the interactive devices are provided at locations that facilitate interaction by other vehicle occupants without impeding a driver's field of view. In this regard, there is scope for improvement of the technology relating to JP-A No. 2005-86604.

SUMMARY

The present disclosure provides a cockpit for a vehicle that may facilitate interaction by a vehicle occupant with an interactive device.

Solution to Problem

A first aspect of to present disclosure is a cockpit for a vehicle, including: an interactive device including: an entry section that collects a first voice message produced by a vehicle occupant, and an output section that outputs a second voice message to the vehicle occupant; and an instrument panel provided at a vehicle cabin front portion, the interactive device being fixed to a vehicle width direction center of the instrument panel, and the entry section and output section being exposed to the vehicle cabin interior.

According to the first aspect described above, the cockpit for a vehicle includes the interactive device and the instrument panel. The interactive device includes the entry section that collects a first voice messages produced by vehicle occupants and the output section that outputs a second voice messages to vehicle occupants. Because the interactive device is fixed at the vehicle width direction center of the instrument panel provided at the vehicle cabin front portion, it is easy for vehicle occupants to recognize the interactive device. The entry section and output section of the interactive device are exposed to the vehicle cabin interior. Therefore, because the interactive device is in a state in which the entry section and output section of the interactive device are not obstructed, it is easy for a vehicle occupant to enter voice messages when interacting with the interactive device and it is easy for the vehicle occupant to hear output voice messages.

A second aspect of the present disclosure is the cockpit for a vehicle of the first aspect in which a plurality of through holes, which communicate an interior part of the interactive device with an exterior part of the interactive device, are formed in a portion of the interactive device at a side thereof that is exposed, apertures of the through holes being arranged so as to be oriented toward a side at which a vehicle occupant seat is disposed.

According to the second aspect described above, the apertures of the through holes, which are formed at the entry section and output section of the interactive device, are arranged to be oriented to the side thereof at which the vehicle occupant seat is disposed. Therefore, a voice message from a vehicle occupant sitting on the vehicle occupant seat easily passes through the apertures of the through holes and propagates to inside the interactive device, and sounds produced by the interactive device easily pass through the apertures of the through holes and propagate toward the vehicle occupant outside the interactive device.

A third aspect of the present disclosure is the cockpit for a vehicle of the second aspect in which the through holes of the interactive device open toward a side at which a driver seat is disposed.

According to the third aspect described above, because the through holes of the interactive device open to be oriented to the side at which the driver seat is disposed, voice message entry from the driver may be conducted more excellently, and the driver may easily hear sounds from the interactive device. Therefore, the driver may interact with the interactive device without driving being impeded.

A fourth aspect of the present disclosure is the cockpit for a vehicle of the second aspect or the third aspect in which the interactive device is attached to the instrument panel such that an orientation of the apertures of the through holes may be altered.

According to the fourth aspect described above, because the interactive device is attached to the instrument panel such that the orientation of the apertures of the through holes may be altered, the interactive device may be oriented toward a side at which a vehicle occupant who is principally using the interactive device is disposed. Therefore, interaction with the interactive device may be conducted comfortably.

A fifth aspect of the present disclosure is the cockpit for a vehicle of any one of the first to fourth aspects in which the entry section and output section of the interactive device protrude further toward a side of the vehicle cabin than a general design surface of the instrument panel, and a surface that links the general design surface with the interactive device in an unbroken fashion, is formed at the instrument panel.

According to the fifth aspect described above, the entry section and output section of the interactive device protrude to the vehicle cabin interior side relative to the general design surface of the instrument panel, and the surface that links the interactive device with the general design surface of the instrument panel in an unbroken fashion, is formed at the instrument panel. Therefore, the interactive device gives an impression of being integrated with the instrument panel but has an appearance that is emphatic relative to the instrument panel. Consequently, vehicle occupants can recognize the interactive device more easily.

The term "general design surface" as used herein is intended to include design surfaces of portions of the instrument panel other than the vicinity of the interactive device.

A sixth aspect of the present disclosure is the cockpit for a vehicle of any one of the first to fifth aspects in which a drink holder for retaining a container is provided at the instrument panel at a vehicle rear side of the interactive device, and the drink holder is formed in a shape that is substantially similar in shape to a region of the instrument panel surrounding the interactive device.

According to the sixth aspect described above, the drink holder that retains a container is provided at the vehicle rear side of the interactive device. Because the drink holder is formed in a shape that is substantially similar in shape to the region of the instrument panel surrounding the interactive device, the impression of integration and sense of continuity of visual design are improved.

The meaning of the term "substantially similar in shape" as used herein is intended to include not just shapes that are completely similar but also shapes that are common to some extent with distinctive features.

A seventh aspect of the present disclosure is the cockpit for a vehicle of the sixth aspect in which a portion, at the vehicle cabin side, of a portion of the drink holder that surrounds the container, is cut away.

According to the seventh, aspect described above, because a portion at the vehicle cabin side of the portion of the drink holder surrounding the container is cut away, a vehicle occupant may view a front face, as seen by the vehicle occupant, of the container retained by the drink holder. Therefore, both ease of use may be improved and a container may be placed in the drink holder. Thus, a space matching personal tastes may be produced.

An eighth aspect of the present disclosure is the cockpit for a vehicle of the sixth aspect or the seventh aspect in which a support member is provided at a vehicle lower side of the drink holder, the support member supporting a bottom face of a container accommodated in the drink holder, and the support member being movable in a vehicle vertical direction.

According to the eighth aspect described above, the support member provided at the vehicle lower side of the drink holdup that supports the bottom face of a container accommodated in the drink holder is movable in a vehicle vertical direction. Thus, the depth inside an accommodation space in the drink holder may be altered. Therefore, the depth of the accommodation space may be altered to suit the size of the container accommodated in the drink holder, such that the container may be put into and taken out of the drink holder easily.

A ninth aspect of the present disclosure is the cockpit for a vehicle of any one of the first to eighth aspects in which an instrument portion is provided at the instrument panel, and an external shape of the instrument portion being formed in a shape that, is substantially similar in shape to a region of the instrument panel surrounding the interactive device.

According to the ninth aspect described above, the instrument portion is provided at the instrument panel. Because this instrument portion is formed in a shape that is substantially similar in shape to the region of the instrument panel surrounding the interactive device, the impression of integration and sense of continuity of visual design are improved.

A tenth aspect of the present disclosure is the cockpit for a vehicle of any one of the first to ninth aspects in which an operation panel equipped with an operation switch is provided at a vehicle rear side of the interactive device, the operation panel having a smaller dimension than the interactive device at least in the vehicle width direction.

According to the tenth aspect described above, the operation panel is provided at the vehicle rear side of a portion retaining the interactive device, and operation switches are provided in the operation panel. Thus, the operation switches may perform operations for which the interactive device is not suited, and ease of operation may be maintained. Because the operation panel having at least a smaller dimension in the vehicle width direction than the interactive device, the interactive device may have greater presence than the operation panel and operation through the interactive device may be promoted.

As described above, the cockpit for a vehicle according to the first aspect may facilitate interaction by a vehicle occupant with the interactive device.

The cockpit for a vehicle according to the second aspect may make interaction with the interactive device even easier.

The cockpit for a vehicle according to the third aspect may facilitate interaction between a driver and the interactive device.

The cockpit for a vehicle according to the fourth aspect may improve ease of use of the interactive device.

The cockpit for a vehicle according to the fifth aspect may both improve visual design and make interaction with the interactive device easier.

The cockpit for a vehicle according to the sixth aspect may further improve visual design.

The cockpit for a vehicle according to the seventh aspect may be more easily personalized by a user.

The cockpit for a vehicle according to the eighth aspect may improve ease of use of the drink holder.

The cockpit for a vehicle according to the ninth aspect may even further improve visual design.

The cockpit for a vehicle according to the tenth aspect may both maintain ease of operation and provide innovative visual designs.

BRIEF DESCRIPTION OF THE DRAWINGS

Exemplary embodiments of the present disclosure will be described in detail based in the following figures, wherein.

DETAILED DESCRIPTION

Figure 1:
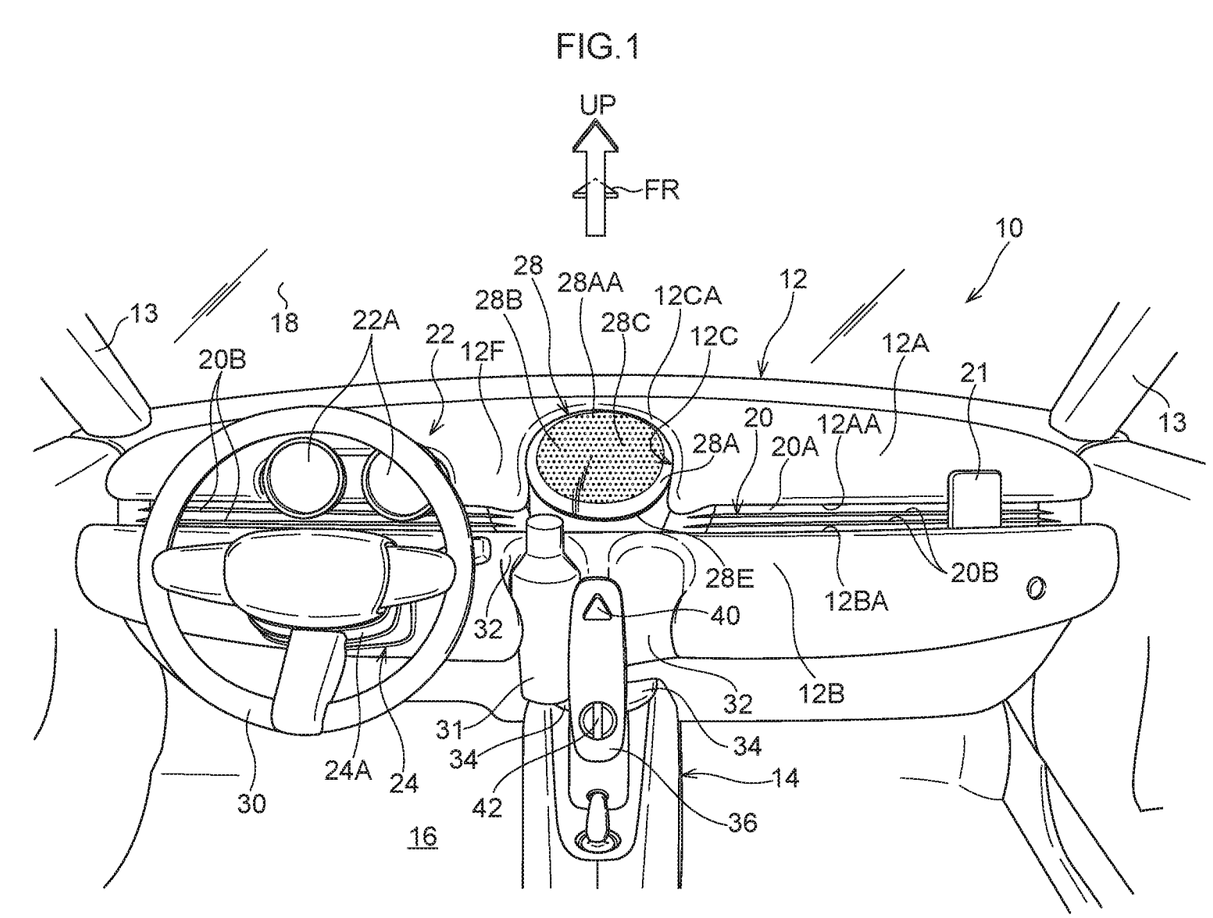
FIG. 1 is a perspective view showing a state in which a cockpit for a vehicle according to an exemplary embodiment is viewed from a vehicle rear side.
Figure 2:
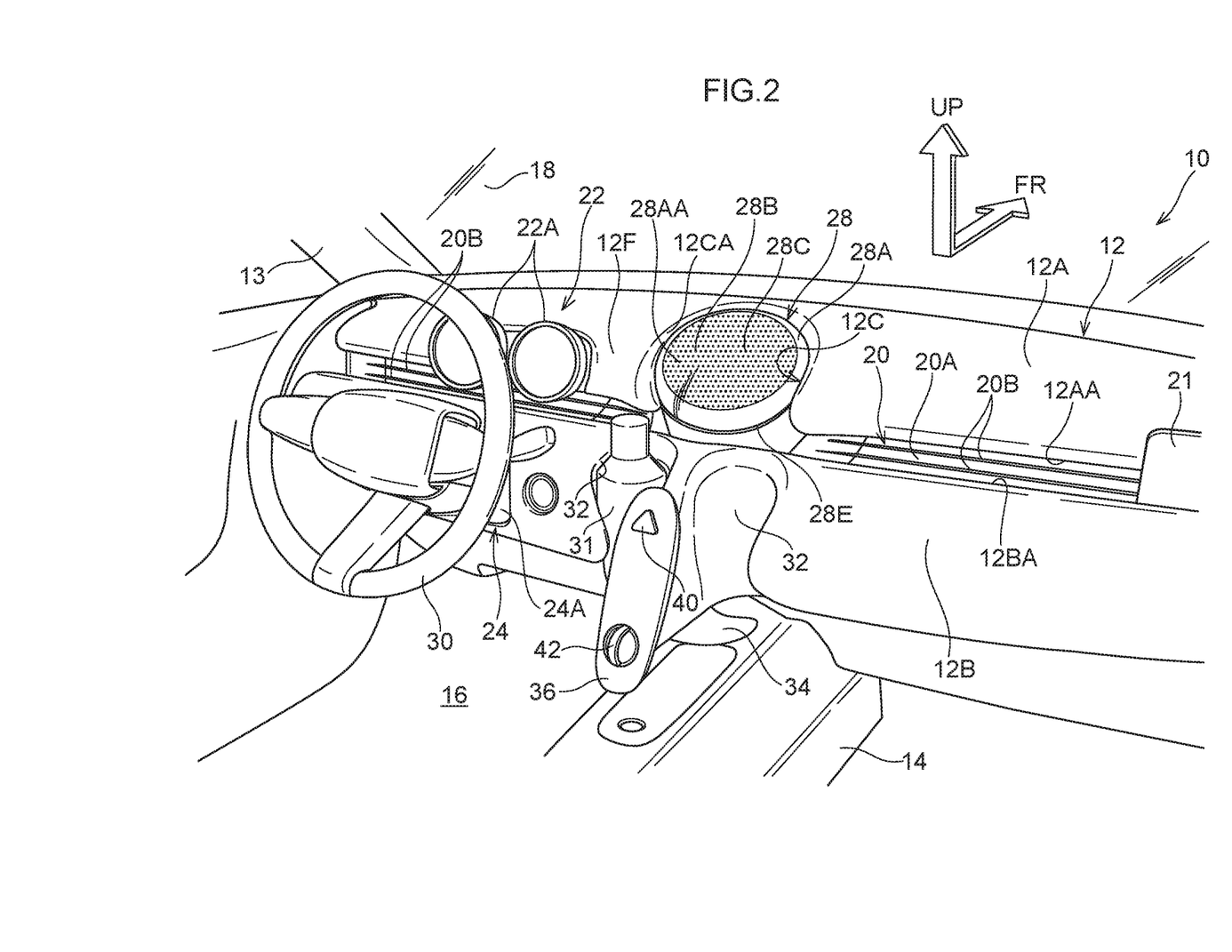
FIG. 2 is a perspective view showing a state in which the cockpit for a vehicle according to the exemplary embodiment is viewed from a vehicle width direction outer side of the vehicle rear side.
Figure 3:
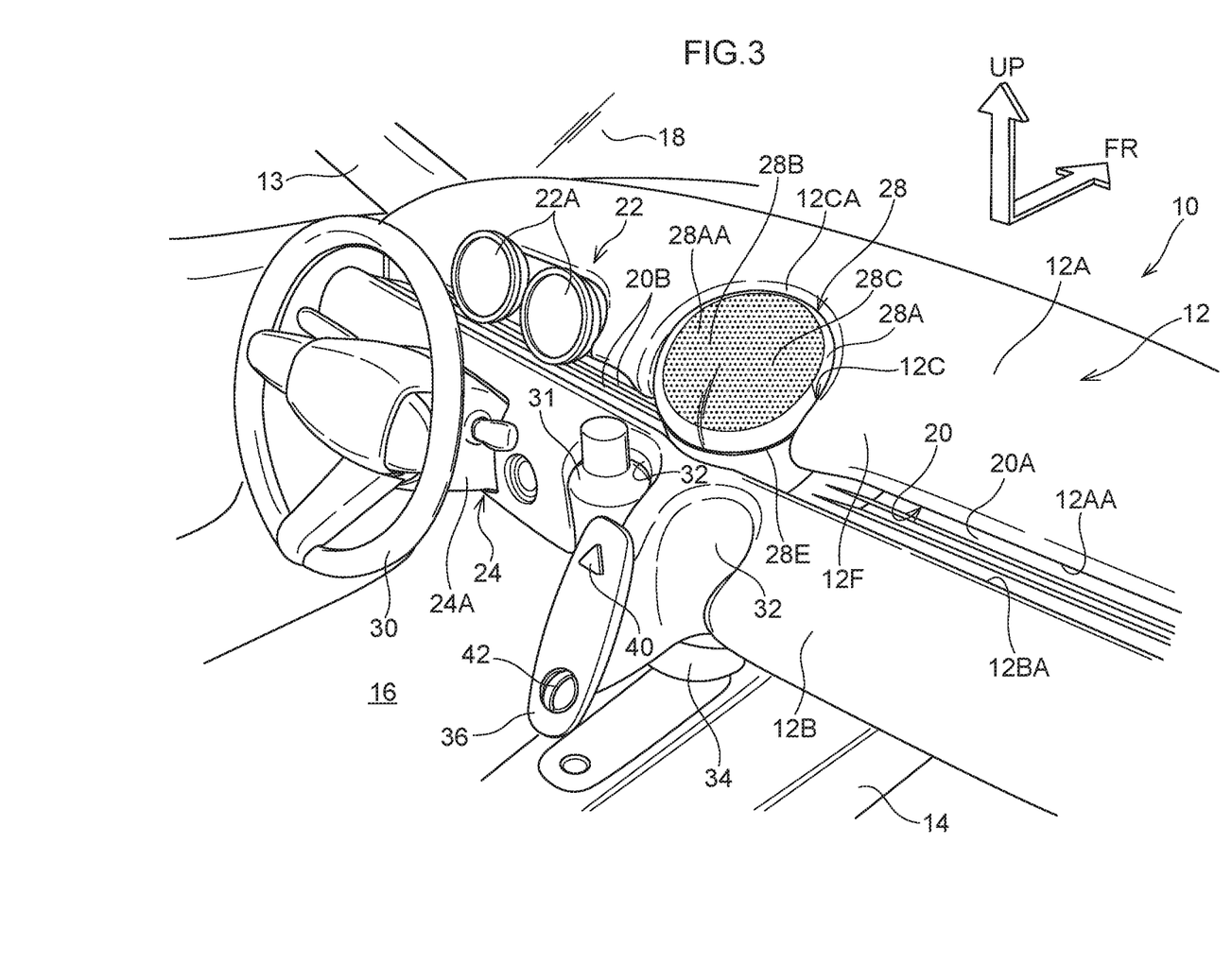
FIG. 3 is a perspective view showing a state viewed from a different angle than FIG. 2.

Herebelow, an exemplary embodiment of the cockpit for a vehicle according to the present disclosure is described using FIG. 1 to FIG. 3.

Overall Structure

As shown in FIG. 1, a cockpit for a vehicle 10 according to the present exemplary embodiment includes an, instrument panel 12 and a center console 14. The instrument panel 12 is provided at the vehicle front side of the interior of a vehicle cabin 16. More specifically, the instrument panel 12 is disposed at an upper portion side of the vehicle rear side of a dash panel (not shown in the drawings) that partitions the vehicle cabin 16 from a vehicle front portion. A lower end portion of the dash panel is joined to a front end portion of a floor panel, which is not shown in the drawings. The floor panel structures a lower face of the vehicle cabin 16. A cowl, which is not shown in the drawings, is joined to an upper end portion of the dash panel. The cowl supports a lower end portion of a front glass 18. The front glass 18 structures a front face of an upper portion side of the vehicle cabin 16. A lower end portion side of the front glass 18 is disposed at an upper end portion side of the instrument panel 12.

Front seats, which serve as vehicle occupant seats for the vehicle but are not shown in the drawings, are provided at the vehicle rear side of the instrument panel 12. In the present exemplary embodiment, a front seat at the right side of a front portion of the vehicle cabin 16 serves as a front passenger seat and a front seat at the left side of the front portion of the vehicle cabin 16 serves as a driver seat. The center console 14 is disposed at a vehicle width direction central portion at the front portion side of the vehicle cabin 16. In the present exemplary embodiment, as an example, a seat front-and-rear direction of each front seat matches the front-and-rear direction of the vehicle, and a seat width direction of the front seat matches the vehicle width direction.

The instrument panel 12 is structured as an interior furnishing that extends in the vehicle width direction. An instrument panel reinforcement (not shown in the drawings) with a long, narrow shape in the vehicle width direction is disposed at an upper portion of an inner side (the vehicle front side) of the instrument panel 12. The instrument panel 12 is attached to the instrument panel reinforcement at plural locations. The instrument panel reinforcement is a pipe member fabricated of metal, both length direction end portions of which are fixed to lower portion sides of a pair of front pillars 13, which are provided upright at left and right vehicle body side portions.

As viewed from the vehicle rear side, the instrument panel 12 extends in the vehicle width direction. The instrument panel 12 includes an upper wall portion 12A that structures an upper face of the instrument panel 12, and a vertical wall portion 12B, a perpendicular direction of which is substantially in the vehicle front-and-rear direction.

The center console 14 extends in the vehicle front-and-rear direction at the vehicle lower side of the vehicle width direction center of the instrument, panel 12. The center console 14 is attached to the floor panel.

A register portion 20 is provided between the upper wall portion 12A and the vertical wall portion 12B. As shown in FIG. 2, the register portion 20 includes a register main body portion 20A and fins 20B. In a vehicle side view, the register main body portion 20A is formed substantially in a "U" shape that opens substantially toward the vehicle rear side. The vehicle front side of the register main body portion 20A is connected with an air conditioner air-guiding duct, which is not shown in the drawings. An upper edge portion of the opening of the register main, body portion 20A serves as a rear edge portion 12AA of the upper wall portion 12A, and a lower edge portion of the opening serves as an upper edge portion 12BA of the vertical wall portion 12B. The upper edge portion 12BA is disposed further to the vehicle rear side than the rear edge portion 12AA, (see FIG. 3), and portions of the register main body portion 20A in the vicinity of the upper edge portion 12BA are disposed further to the vehicle lower side than the upper edge portion 12BA. Therefore, the register portion 20 may retain a small item such as, for example, a smartphone 21.

The fins 20B are plurally provided inside the register main body portion 20A and are formed in plate shapes, length directions of which are in the vehicle width direction and plate thickness directions of which, are substantially in the vehicle vertical direction. A plural number (two in the present exemplary embodiment) of the fins 20B are provided at each of the driver seat side and the front passenger seat side. The register main body portion 20A is provided as a pair at left and right, sandwiching an interactive device retention portion 12C. The interactive device retention portion 12C, which is described below, is provided at a vehicle width direction central portion. That is, the register portion 20 is provided at regions excluding the vehicle width direction center of the instrument panel 12. The plural fins 20B are provided to be spaced apart from one another in the vehicle vertical direction.

An instrument portion 22 and a column portion 24 are provided at the driver seat side of the instrument panel 12. More specifically, the instrument portion 22 is provided at the rear edge portion 12AA of the upper wall portion 12A. In a vehicle plan view, the rear edge portion 2AA at which the instrument portion 22 is provided is formed in a shape that is cut away so as to form a recess toward the vehicle front side (see FIG. 3). Instruments 22A are provided in the instrument portion 22. For example, two of the instruments 22A are formed in substantially circular column shapes, whose axial directions are substantially in the vehicle front-and-rear direction, and are provided side by side in the vehicle width direction. Diametric dimensions of the instruments 22A are specified to be smaller than a diametric dimension of an interactive device 28, which is described below.

The column portion 24 is provided at the vertical wall portion 12B. The column portion 24 includes a cutaway inside which a column cover 24A is provided. The column cover 24A covers a steering column, which is not shown in the drawings. A steering wheel 30 that is linked with the steering, column is provided at the vehicle cabin interior side of the column cover 24A.

Interactive Device Retention Portion

The interactive device retention portion 12C is formed as portions of the instrument panel 12 surrounding the interactive device 28, at the vehicle width direction central portion of the upper wall portion 12A of the instrument panel 12. The interactive device retention portion 12C is formed in a substantially circular tube shape whose axial direction is angled to the vehicle rear side toward the vehicle upper side. A portion of the vehicle rear side of the interactive device retention portion 12C is open, and the interactive device retention portion 12C accommodates the interactive device 28 thereinside. An upper part outer edge portion 12CA serves as a linking surface of the interactive device retention portion 12C. The upper part outer edge portion 12CA is formed in a shape that protrudes toward the vehicle upper side relative to a general design surface 12F, which is design surfaces other than the upper part outer edge portion 12CA, so as to link the general design surface 12F with a display panel integration cover 28A, which serves as an upper face of the interactive device 28 and is described below. Portions of the vehicle rear side of the upper part outer edge portion 12CA are cut away and the upper part outer edge portion 12CA is structured to be continuous with the register portion 20 and the interactive device retention portion 12C. That is, the vehicle rear sides of side faces of the interactive device 28 are exposed to the interior of the vehicle cabin 16.

Interactive Device

The interactive device 28 is a device known as an AI (artificial intelligence) speaker or smart speaker. The interactive device 28 is formed in, for example, a substantially circular column shape whose axial direction is substantially in the vehicle vertical direction. An entry section 28B and an output section 28C are each provided at the vehicle upper side of the interactive device 28. Plural microphones, which are not mown in the drawings, are provided inside the entry section 28B. Plural speakers, which are not shown in the drawings, are provided inside the output section 28C. The entry section 28B and the output section 28C are covered by the display panel integration cover 28A, which is formed in a dome shape that structures an upper portion of the interactive device 28 and is exposed to the interior of the vehicle cabin 16.

A plural number of through holes 28AA are formed in the display panel integration cover 28A. The through holes 28AA are formed so as to open towards the left side of the front portion of the vehicle cabin 16, which is to say toward the driver seat side. The display panel integration cover 28A includes a display panel, which is not shown in the drawings, at a hack face side thereof. The display panel can display text, graphics and the like in accordance with commands from a control section, which is not shown in the drawings. For example, text, graphics and the like displayed at the display panel can be seen through the through holes 28AA from the side at which the through holes 28AA open into the vehicle cabin 16. The interactive device 28 is fixed inside the interactive device retention portion 12C to be turnable within the interactive device retention portion 12C by a turning mechanism, which is not shown in the drawings, about an axial direction substantially in the vehicle vertical direction. Consequently, apertures of the through holes 28AA of the display panel integration cover 28A may be oriented toward the right side of the front portion of the vehicle cabin 16, which is to say toward the front passenger seat side.

Now, operation of the interactive device 28 is described. The interactive device 28 further includes, for example, an identification section, a generation section and a communications section (none of which are shown in the drawings). A voice message collected by the entry section 28B is converted to voice signals by the microphones of the try section 28B and reported to the identification section. The identification section acquires voice strengths representing volumes of the voice message from the voice signals reported from the entry section 28B, and identifies which direction the voice message is originating from. The identification section reports the identified direction of the voice message to the control section, and reports the voice signals to the generation section.

The generation section analyzes the content of the voice message represented by the voice signals reported from the identification section, and generates a response text depending on the content of the voice message. More specifically, for example, the communications section is equipped with a communications protocol connecting to a communications circuit such as the Internet or the like. The generation section conducts data communications with an externally provided intelligent server via the communications section and generates a response text appropriate to the content of the voice message.

Various kinds of information are memorized in the intelligent server, which transmits information requested by the interactive device 28 to the interactive device 28. The intelligent server may be constituted by, for example, cloud computing.

For example, if the generation section receives voice signals with the content "How is the weather in Tokyo today?" from the identification section, the generation section generates and transmits an electronic message to the intelligent server requesting today's weather in Tokyo. If the information "sunny" is received from the intelligent server in response, the generation section uses a pre-specified learning model to generate, from the content of the voice message received from the identification section and the information received from the intelligent server, a response text saying, for example, "The weather in Tokyo today is sunny."

The generation section may also use a pre-specified learning model for interpreting the content of a voice message received from the identification section. The learning model that is used may be, for example, a multilayer neural network that, using a combination of training, signals and input signals, has previously learned weightings between neurons through deep learning or the like.

After the generation section has converted the content of the voice message received from the identification section to a text using publicly known techniques, the generation section conducts, for example, morphological analysis on the text and divides the text into morphemes. Then, by inputting the morphemes of the divided text into the learning model, the generation section may interpret the content of the text.

The generation section may then generate a response to the content of the text represented by the voice message received from the identification section, for example, by inputting both the morphemes of the text represented by the voice message received from the identification section and information received from the intelligent server into the learning model.

Thus, by using learning of human knowledge and using artificial intelligence that artificially expresses human reasoning and decision-making on the basis of various kinds of information, the generation section generates a response text corresponding to the content of the voice message represented by the voice signals received from the identification section.

The generation section reports the generated response text to the output section 28C. The output section 28C converts the response text generated by the generation section to voice signals using publicly known voice synthesis processing, and outputs the converted voice signals to the speakers of the output section 28C. Thus, responses to voice messages giving commands and questions to the interactive device 28 that are collected by the entry section 28B are outputted from the output section 28C in the form of voice messages.

When the output section 28C converts a response text to voice signals, the output section 28C uses a voice with voice characteristics that are pre-specified as standard (below referred to as "the standard voice"). That is, characteristics such as pitch and speaking rate of the voice message outputted from the output section 28C correspond with voice characteristics of the standard voice.

The output section 28C obeys commands from the control section relating to at least one of a voice strength of voice messages and speakers that are to output the voice messages.

The control section acquires information required for control from the respective functional sections—the entry section 28B, the identification section, the generation section, the communications section and the output section 28C—and controls processing of the functional sections in, accordance with the acquired information.

A light emitting section 28E is provided at the vehicle rear side of a side face of the interactive device 28. More specifically, the light emitting section 28E is provided in a region exposed to the interior of the vehicle cabin 16 by the upper part outer edge portion 12CA of the interactive device retention portion 12C being cut away. The light emitting section 28E illuminates in various colors and light emission patterns in accordance with commands from the control section, and is capable of, for example, altering emitted colors and light emission patterns in accordance with details of interactions. Consequently, it is easier for a vehicle occupant to understand whether or not the interactive device 28 recognizes an interaction.

Drink Holder

A left and right pair of drink holders 32 are provided at the vertical wall portion 12B at the vehicle width direction center of the instrument panel 12. Each drink holder 32 is formed in a substantially circular tube shape, of which shape a portion of a side face at the vehicle rear side, an end portion at the vehicle upper side and an end portion at the vehicle lower side are opened up. In other words, portions at the vehicle rear side of side faces of the drink holders 32 are cut away. Thus, the shape of each drink holder 32 is substantially similar to the shape in a vehicle plan view of the interactive device retention portion 12C of the upper wall portion 12A of the instrument panel 12. A diametric dimension of the drink holder 32 is set to, for example, a size capable of accommodating a water bottle 31 that is commercially available with a capacity of around 500 mL.

A support member 34 is provided at the vehicle lower side of the drink holders 32. The support member 34 may support bottom faces of containers accommodated in the drink holders 32 from the vehicle lower side thereof. The support member 34 is a plate-shaped member whose plate thickness direction is in the vehicle vertical direction. The support member 34 is specified with a size that fits inside the drink holders 32 in the vehicle plan view. The support member 34 is provided to extend to respective vehicle width direction outer sides from a region of the instrument panel 12 at the middle of the left and right pair of drink holders 32. The support member 34 is movable substantially in the vehicle vertical direction within the drink holders 32 by an operation member, which is not shown in the drawings, and the support member 34 may be fixed in place at arbitrary positions.

Operation Panel

An operation panel 36 is provided at the vehicle rear side of the interactive device 28. The operation panel 36 is formed in a substantially rectangular shape in a vehicle elevation view, with a length direction substantially in the vehicle vertical direction. A hazard lamp switch 40 and an air conditioner operation switch 42 that serve as operation switches are provided at the operation panel 36. The operation panel 36 is attached to a vehicle rear side face of a region of the instrument panel 12 between the left and right pair of drink holders 32. A dimension of the operation panel 36 in the vehicle width direction is specified to be smaller than a dimension of the interactive device 28 in the vehicle width direction. The operation panel 36 is mounted to be angled to the vehicle front side toward the vehicle upper side. Thus, the operation panel 36 is structured such that the hazard lamp switch 40 and the air conditioner operation switch 42 are oriented to the side thereof at winch a vehicle occupant is disposed.

Operation of the Exemplary Embodiment

Now, operation of the present exemplary embodiment is described.

In the present exemplary embodiment, the cockpit for a vehicle 10 includes the interactive device 28 and the instrument panel 12. The interactive device 28 includes the entry section 28B that collects voice messages produced by vehicle occupants and the output section 28C that outputs voice messages to vehicle occupants. Because the interactive device 28 is fixed at the vehicle width direction center of the instrument panel 12 provided at the front portion of the vehicle cabin 16, it is easy for vehicle occupants to recognize the interactive device 28. The entry section 28B and output section 28C of the interactive device 28 are exposed to the interior of the vehicle cabin. Therefore, because the interactive device 28 is in a state in which the entry section 28B and the output section 28C of the interactive device 28 are not obstructed, it is easy for a vehicle occupant to enter voice messages when interacting with the interactive device 28 and it is easy for the vehicle occupant to hear output voice messages. Therefore, interaction with the interactive device 28 by voice occupants may be facilitated.

The apertures of the through holes 28AA formed at the entry section 28B and output section 28C of the interactive device 28 are arranged to be oriented to a side thereof at which a vehicle occupant seat is disposed. Therefore, the voice of a vehicle occupant sitting on the vehicle occupant seat easily passes through the apertures of the through holes 28AA and propagates to aside the interactive device 28, and sounds produced by the interactive device 28 easily pass through the apertures of the through holes 28AA and propagate toward a vehicle occupant outside the interactive device 28. Therefore, interaction F with the interactive device 28 may be conducted more easily.

Because the through holes 28AA of the interactive device 28 open to be oriented to the side thereof at which the driver seat is disposed, voice entry by a driver may be conducted more excellently, and the driver may easily hear sounds from the interactive device 28. Therefore, the driver may interact with the interactive device 28 without driving being, impeded. Thus, interaction between the driver and the interactive device 28 may be facilitated.

Because the interactive device 28 is attached to the instrument panel 12 such that the orientation of the apertures of the through holes 28AA can be altered by the turning mechanism, the interactive device 28 may be oriented toward a side at which a vehicle occupant who is principally using the interactive device 28 is disposed. Therefore, interaction with the interactive device 28 may e conducted comfortably. Thus, ease of use of the interactive device 28 tray be improved.

The entry section 28B and output section 28C of the interactive device 28 protrude to the vehicle cabin interior side relative to the general design surface 121 of the instrument panel 12, and the upper part outer edge portion 12CA that smoothly links the interactive device 28 with the general design surface 12F of the instrument panel 12 is formed at the instrument panel 12. Therefore, the entry section 28B and output section 28C of the interactive device 28 give an impression of being integrated with the instrument panel 12 but have an appearance that is emphatic relative to the instrument panel 12. Consequently, vehicle occupants can recognize the interactive device 28 more easily. Thus, both visual designs may be improved and interaction with the interactive device 28 may be conducted more easily.

The drink holder 32 that retains the water bottle 31 or the like is provided at the vehicle rear side of the interactive device 28. Because the drink holder 32 is formed in a shape that is substantially similar in shape to the interactive device retention portion 12C of the instrument panel 12, the impression of integration and sense of continuity of visual design are improved. Therefore, visual design may be further improved.

Because a portion at the vehicle cabin 16 side of the portion of the drink holder 32 surrounding the water bottle 31 is cut away and opened up, a vehicle occupant may view a front face, as seen by the vehicle occupant, of the water bottle 31 retained by the drink holder 32. Therefore, both ease of use may be improved and a water bottle 31 may be placed in the drink holder 32. Thus, a space matching personal tastes may be produced, and personalization by a user is easier.

Because the support member 34 provided at the vehicle lower side of the drink holders 32 that supports the bottom faces of containers accommodated in the drink holders 32 is movable in the vehicle vertical direction, the depth inside accommodation spaces in the drink holders 32 may be altered. Therefore, the depth of the accommodation spaces may be altered to suit the size of containers accommodated in the drink holders 32, such that the containers may be put into and taken out of the drink holders 32 easily. Thus, ease of use ma be improved.

The instrument portion 22 is provided at the instrument panel 12. Because this instrument portion 22 is formed in a shape that is substantially similar in shape to the interactive device retention portion 12C of the instrument panel 12, the impression of integration and sense of continuity of visual design is improved. Thus, visual design may be even further improved.

The operation panel 36 is provided at the vehicle rear side of the interactive device retention portion 12C, and the hazard lamp switch 40 and air conditioner operation switch 42 are provided in the operation panel 36. Therefore, operations for which the interactive device 28 is not suited may be performed via the operation panel 36, and ease of operation may be maintained. The operation panel 36 is specified with at least a smaller dimension in the vehicle width direction than the interactive device 28, and the interactive device 28 is specified to be larger than the instruments 22A. Thus, of members in the vehicle cabin 16 that are used during, driving of the vehicle, the interactive device 28 is the second largest after the steering wheel 30, and the interactive device 28 is provided at the vehicle width direction center of the instrument panel 12. Thus, the interactive device 28 gives the impression of being a "central pillar" at the center of the instrument panel 12. Therefore, the interactive device 28 may have greater presence than the operation panel 36 and operation through the interactive device 28 may be promoted. In addition, the number of other switches is smaller, providing a neat appearance. Therefore, both ease of operation may be maintained and innovative visual designs may be provided.

In the exemplary embodiment described above, the interactive device 28 is formed in a substantially circular column shape, but this is not limiting. Alternative shapes such as a square column shape and the like are possible. In addition, the shapes of the interactive device retention portion 12C and the drink holders 32 may also be alternative shapes such as square tube shapes and the like. The shapes of the interactive device retention portion 12C and the drink holders 32 are shapes that are substantially similar in the vehicle plan view, but this is not limiting. The interactive device retention portion 12C and the drink holders 32 may have different shapes.

The interactive device 28 is provided with the through holes 28AA in the display panel integration cover 28A, but this is not limiting. Structures are possible in which the through holes 28AA are not provided in the display panel integration cover 28A, and structures are possible in which the through holes 28AA are provided in alternative regions.

The entry section 28B and output section 28C of the interactive device 28 protrude further to the vehicle cabin interior side than the general design surface 12F of the instrument panel 12, but this is not limiting. The interactive device 28 may be provided to be substantially coplanar with the general design surface 12F of the instrument panel 12. Further, the upper part outer edge portion 12CA is formed in the instrument panel 12 in a shape that bulges so as to smoothly link the interactive device 28 with the general design surface 12F of the instrument panel 12, but this is not limiting. The upper part outer edge portion 12CA may have an alternative shape such as a flat shape or the like.

The interactive device 28 is configured to output responses to voice messages giving commands and questions to the interactive device 28, which are collected by the entry section 28B, in the form of voice messages from the output section 28C, but this is not limiting. Configurations are possible such that commands are sent to other devices inside or outside the vehicle in response to commands and questions given to the interactive device 28.

An exemplary embodiment of the present disclosure is described hereabove. However, the present disclosure is not limited by these descriptions and it will be clear that numerous modifications beyond these descriptions may be embodied within a technical scope not departing from the gist of the present disclosure.

What is claimed is:

1. A cockpit for a vehicle, comprising:
   an interactive device including:
   an entry section that collects a first voice message produced by a vehicle occupant, and
   an output section that outputs a second voice message to the vehicle occupant; and
   an instrument panel provided at a vehicle cabin front portion, the interactive device being fixed to a vehicle width direction center of the instrument panel, and the entry section and output section being exposed to the vehicle cabin interior,
   wherein a plurality of through holes, which communicate an interior part of the interactive device with an exterior part of the interactive device, are formed in a portion of the interactive device at a side thereof that is exposed, apertures of the through holes being arranged so as to be oriented toward a side at which a vehicle occupant seat is disposed.

2. The cockpit for a vehicle according to claim 1, wherein the through holes of the interactive device open toward a side at which a driver seat is disposed.

3. The cockpit for a vehicle according to claim 1, wherein the interactive device is attached to the instrument panel such that an orientation of the apertures of the through holes may be altered.

4. The cockpit for a vehicle according to claim 1, wherein:
   the entry section and output section of the interactive device protrude further toward a side of the vehicle cabin than a general design surface of the instrument panel, and a surface that links the general design surface with the interactive device in an unbroken fashion, is formed at the instrument panel.

5. The cockpit for a vehicle according to claim 1, wherein:
a drink holder for retaining a container is provided at the instrument panel at a vehicle rear side of the interactive device, and
the drink holder is formed in a shape that is substantially similar in shape to a region of the instrument panel surrounding the interactive device.

6. The cockpit for a vehicle according to claim 5, wherein a portion, at the vehicle cabin side, of a portion of the drink holder that surrounds the container, is cut away.

7. The cockpit for a vehicle according to claim 5, wherein a support member is provided at a vehicle lower side of the drink holder, the support member supporting a bottom face of a container accommodated in the drink holder, and the support member being movable in a vehicle vertical direction.

8. The cockpit for a vehicle according to claim 1, wherein:
an instrument portion is provided at the instrument panel, and
an external shape of the instrument portion being formed in a shape that is substantially similar in shape to a region of the instrument panel surrounding the interactive device.

9. The cockpit for a vehicle according to claim 1, wherein an operation panel equipped with an operation switch is provided at a vehicle rear side of the interactive device, the operation panel having a smaller dimension than the interactive device at least in the vehicle width direction.

10. A cockpit for a vehicle, comprising:
an interactive device including:
an entry section that collects a first voice message produced by a vehicle occupant, and
an output section that outputs a second voice message to the vehicle occupant; and
an instrument panel provided at a vehicle cabin front portion, the interactive device being fixed to a vehicle width direction center of the instrument panel, and the entry section and output section being exposed to the vehicle cabin interior, wherein:
a drink holder for retaining a container is provided at the instrument panel at a vehicle rear side of the interactive device, and
the drink holder is formed in a shape that is substantially similar in shape to a region of the instrument panel surrounding the interactive device.

11. The cockpit for a vehicle according to claim 10, wherein:
the entry section and output section of the interactive device protrude further toward a side of the vehicle cabin than a general design surface of the instrument panel, and
a surface that links the general design surface with the interactive device in an unbroken fashion, is formed at the instrument panel.

12. The cockpit for a vehicle according to claim 10, wherein a portion, at the vehicle cabin side, of a portion of the drink holder that surrounds the container, is cut away.

13. The cockpit for a vehicle according to claim 10, wherein a support member is provided at a vehicle lower side of the drink holder, the support member supporting a bottom face of a container accommodated in the drink holder, and the support member being movable in a vehicle vertical direction.

14. The cockpit for a vehicle according to claim 10, wherein:
an instrument portion is provided at the instrument panel, and
an external shape of the instrument portion being formed in a shape that is substantially similar in shape to a region of the instrument panel surrounding the interactive device.

15. The cockpit for a vehicle according to claim 10, wherein an operation panel equipped with an operation switch is provided at a vehicle rear side of the interactive device, the operation panel having a smaller dimension than the interactive device at least in the vehicle width direction.

* * * * *